July 28, 1931.  I. A. MORRIS  1,816,393

TRAILER

Filed May 26, 1930

Inventor
Ira A. Morris

By Hardway Lathey
Attorneys

Patented July 28, 1931

1,816,393

UNITED STATES PATENT OFFICE

IRA A. MORRIS, OF LIBERTY, TEXAS

TRAILER

Application filed May 26, 1930. Serial No. 455,678.

This invention relates to new and useful improvements in a trailer.

One object of the invention is to provide a trailer of the character described, equipped with novel means for mounting the bowlster thereon.

Another object of the invention resides in the provision of a trailer equipped with novel means for connecting the same to the coupling pole whereby the trailer may be connected to a truck.

The invention also comprehends a novel type of axle for a trailer.

With the above and other objects in view, the invention has particular relation to certain novel features of construction, arrangement of parts and operation, an example of which is given in this specification and illustrated in the accompanying drawings, wherein.

Figure 1:
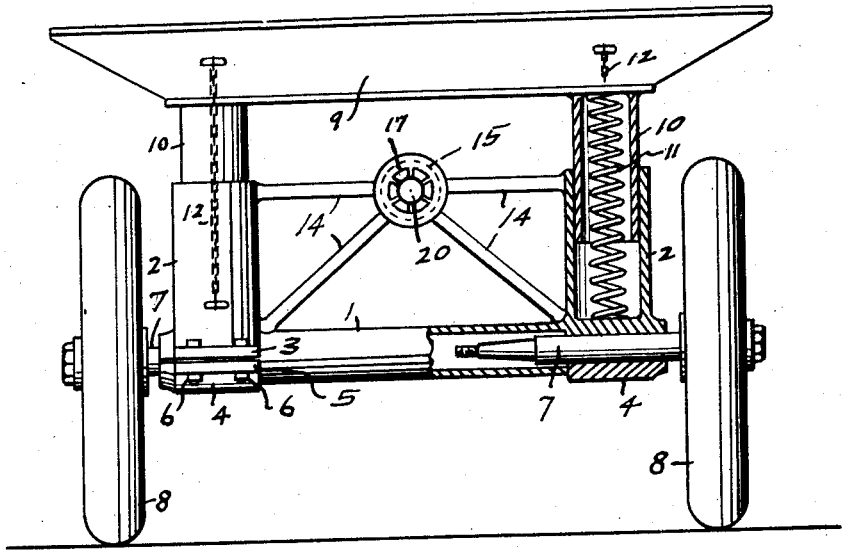
Figure 1 shows a rear view of the trailer partly in section.
Figure 2:
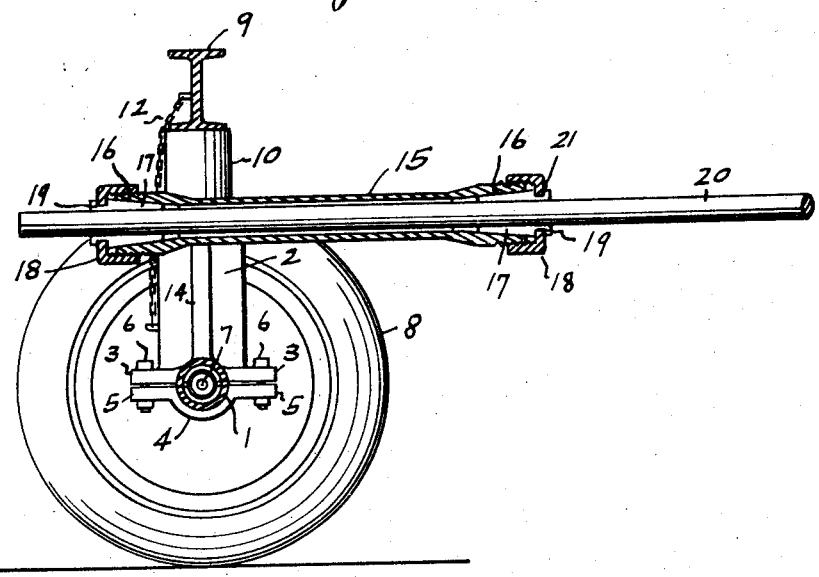
Figure 2 shows a longitudinal sectional view.

Referring now more particularly to the drawings, the numeral 1 designates a tubular housing, upstanding from the respective ends of which are the sleeves 2, 2. The lower end of each sleeve is provided with the forwardly and rearwardly extending brackets 3, 3 and the opposing portion of the housing 1 is cut away to provide space to receive the bearing member 4 having the end brackets 5, 5 confronting the corresponding brackets 3, 3 and secured thereto by the bolt and nut assembly, 6. There are the wheel spindles 7, 7, fitted into the respective ends of the axle housing and clamped therein between the bearings 4 beneath and the opposing portion of the housing, above. These spindles 7 are reversible, that is, they have similar ends so that in case one end should become broken off, the spindle can be reversed and the other end used.

There is a bowlster 9 having the depending sleeves 10, 10 which telescope within the sleeves 2, 2 and this bowlster is mounted on suitable coil springs 11 housed within said telescoping sleeves.

The upward movement of the bowlster is limited by suitable chains or other checks as 12, 12 whose upper ends are attached to the the bowlster and whose lower ends are attached to the sleeves 2. Above and anchored to the axle housing 1, by means of a truss structure 14, there is a sleeve like tubular bearing member 15 which extends forwardly and whose respective ends are outwardly flared forming the inside flared seats 16, 16 in which are wedge shaped slips 17, 17 formed of sections. Each end of the bearing 15 is externally threaded to receive a flanged nut 18 which is threaded thereon. These nuts have the central bearings 19 through which the coupling pole 20 is fitted.

The outer end of each slip section 17 has an external notch 21 in which the inner margin of the nut 18 fits.

As the nuts 18 are screwed up the slip sections 17 will be forced inwardly into gripping relation with the coupling pole 20 and said coupling pole will be thereby held securely in place. If it be desired to adjust the coupling pole 20, the nuts 18 may be partly unscrewed and as they move outwardly, they will unseat the slips 17 and the adjustment may then be made, and the nuts 18 then screwed up to seat the slip sections in the seats 16 in gripping relation with the coupling pole 20.

The drawings and description disclose what is now considered to be a preferred form of the invention by way of illustration only, while the broad principle of the invention will be defined by the appended claims.

What I claim is:

1. A trailer having a tubular bearing member attached thereto to receive a coupling pole, each end of said member having an outwardly flared seat, slips in said seats around said pole, nuts on the ends of said member to actuate the slips into, or out of, engaging relation with the coupling pole.

2. A trailer having a tubular bearing member attached thereto to receive a coupling pole, each end of said bearing member having an outwardly flared seat, slips in said seats adapted to surround said pole and to wedge between said pole and seats, flanged nuts having a threaded connection with the ends of said member and connected to said slips.

3. A trailer having a tubular axle housing having a contractile end bearings, detachable, reversible, spindles clamped in the respective bearings of the housing and ground wheels on the outer end of the spindles.

4. A trailer including an axle, a bowlster yieldingly supported thereon, a tubular bearing member secured to said axle and having flared, end seats, a coupling pole through said member, slips in said seats around said pole and means securing said slips seated in said seats in gripping relation with said pole, said means being releasable to permit the release of said slips from such gripping relation.

5. A trailer having an elongated bearing member shaped to receive a coupling pole whereby the trailer may be connected to a draft vehicle, and releasable means for securing said pole in said bearing.

6. A trailer having an axle, ground wheels, an elongated bearing member shaped to receive a coupling pole whereby the trailer may be connected to a draft vehicle, and means arranged at spaced intervals in the bearing effective to engage said coupling pole to retain said pole in said bearing.

In testimony whereof I have signed my name to this specification.

IRA A. MORRIS